US007483782B2

(12) United States Patent
Chauvin et al.

(10) Patent No.: US 7,483,782 B2
(45) Date of Patent: Jan. 27, 2009

(54) METHOD OF ESTIMATING THE FUEL/AIR RATIO IN A CYLINDER OF AN INTERNAL-COMBUSTION ENGINE BY MEANS OF AN ADAPTIVE NONLINEAR FILTER

(75) Inventors: Jonathan Chauvin, Vincennes (FR); Philippe Moulin, Paris (FR); Gilles Corde, Bois-Colombes (FR); Nicolas Petit, Sceaux (FR); Pierre Rouchon, Meudon (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 11/437,702

(22) Filed: May 22, 2006

(65) Prior Publication Data

US 2006/0271271 A1 Nov. 30, 2006

(30) Foreign Application Priority Data

May 30, 2005 (FR) .................................... 0505442

(51) Int. Cl.
*G06F 19/00* (2006.01)
*F02D 41/14* (2006.01)

(52) U.S. Cl. ........................ 701/109; 123/673; 701/115

(58) Field of Classification Search ................. 123/673, 123/674, 693–696; 701/103–105, 109, 101, 701/102, 115
See application file for complete search history.

(56) References Cited

U.S. PATENT DOCUMENTS

| | | | | |
|---|---|---|---|---|
| 4,903,668 | A * | 2/1990 | Ohata | 123/478 |
| 5,535,135 | A * | 7/1996 | Bush et al. | 701/109 |
| 5,839,415 | A | 11/1998 | Suzuki et al. | |
| 5,911,682 | A | 6/1999 | Kato et al. | |
| 6,021,767 | A * | 2/2000 | Yasui et al. | 123/674 |
| 6,026,793 | A * | 2/2000 | Yasui et al. | 123/674 |
| 6,092,017 | A | 7/2000 | Ishida et al. | |
| 6,125,831 | A * | 10/2000 | Yasui et al. | 123/674 |
| 6,357,429 | B1 | 3/2002 | Carnevale et al. | |
| 6,830,042 | B2 | 12/2004 | Ikemoto | |
| 6,882,929 | B2 | 4/2005 | Liang et al. | |
| 7,051,725 | B2 | 5/2006 | Ikemoto et al. | |
| 7,086,391 | B2 * | 8/2006 | Moulin et al. | 123/673 |
| 7,195,008 | B2 | 3/2007 | Annoura et al. | |

(Continued)

FOREIGN PATENT DOCUMENTS

EP 0 688 945 A2 12/1995

(Continued)

*Primary Examiner*—Willis R Wolfe, Jr.
(74) *Attorney, Agent, or Firm*—Antonelli, Terry, Stout & Kraus, LLP.

(57) ABSTRACT

The present invention relates to a method of estimating the fuel/air ratio in each cylinder of an injection internal-combustion engine comprising an exhaust circuit on which a detector measures the fuel/air ratio of the exhaust gas. An estimator based on an adaptive nonlinear filter is coupled with a physical model representing the expulsion of the gases from the cylinders and their travel in the exhaust circuit to the detector. The estimator is also coupled with an estimation of the fuel/air ratio measured from at least one variable of said model such as the total mass of exhaust gas and the mass of fresh air. The method has application to engine controls.

22 Claims, 5 Drawing Sheets

U.S. PATENT DOCUMENTS

2005/0022797 A1 2/2005 Ikemoto et al.

FOREIGN PATENT DOCUMENTS

EP 0 724 073 A2 7/1996
JP 02157452 A * 6/1990 ................. 701/109
JP 2005-248962 9/2005
JP 2006-336645 12/2006

* cited by examiner

METHOD OF ESTIMATING THE FUEL/AIR RATIO IN A CYLINDER OF AN INTERNAL-COMBUSTION ENGINE BY MEANS OF AN ADAPTIVE NONLINEAR FILTER

CROSS REFERENCE TO RELATED APPLICATION

Reference is made to U.S. application Ser. No. 11/437,629, entitled "Method of Estimating the Fuel/Air Ratio in a Cylinder of an Internal-Combustion Engine by Means of an Extended Kalman Filter", filed on May 22, 2006, which is assigned to the Assignee of the present application.

BACKGROUND OF THE INVENTION

1. Field of the Invention

The present invention relates to a method of estimating the fuel/air ratio of each cylinder of a fuel injected internal-combustion engine from a fuel/air ratio measurement downstream from the manifold and an adaptive nonlinear filter.

2. Description of the Prior Art

Knowledge of the fuel/air ratio, characterized by the mass of fuel to the mass of air, is important for all vehicles, whether equipped with gasoline engines, since it conditions good combustion of the mixture when it is close to 1, or with diesel engines, in which case the interest of knowing the fuel/air ratio is different insofar as diesel engines run under lean mixture conditions (ratio below 1). In particular, catalysts using a NOx trap lose efficiency in the course of time. In order to recover optimum efficiency, the fuel/air ratio has to be maintained close to 1 for some seconds, prior to returning to normal running conditions with a lean mixture. Depollution by DeNox catalysis therefore requires precise control of the fuel/air ratio cylinder by cylinder.

A probe arranged at the turbine outlet (supercharged engine) and upstream from the NOx trap therefore gives a measurement of the mean fuel/air ratio as a result of the exhaust process. This measurement being highly filtered and noise-affected is used for control of the masses injected into the cylinders during fuel/air ratio phases of 1, each cylinder receiving then the same mass of fuel.

In order to control more precisely, and in particular individually, injection of the fuel masses into the cylinders, reconstruction of the fuel/air ratio in each cylinder is necessary. Since installing fuel/air ratio probes at the outlet of each cylinder of a vehicle cannot be done considering their cost price, setting an estimator working from the measurements provided by a single probe advantageously allows to separately know the fuel/air ratios in each cylinder.

An engine control can thus, from the reconstructed fuel/air ratios, adjust the fuel masses injected into each cylinder so that the fuel/air ratios are balanced in all the cylinders.

French Patent 2,834,314 describes the definition of a model, based upon observation and filtering by means of a Kalman filter. This model contains no physical description of the mixture in the manifold and does not take into account highly pulsating flow rate phenomena.

Estimation of the fuel/air ratio in the cylinders is only conditioned by the coefficients of a matrix, coefficients that can be identified off-line by means of an optimization algorithm. Each working point (engine speed/load) requires a different adjustment of the matrix and an identification of parameters. This estimator thus requires heavy acquisition test means (with 5 fuel/air ratio probes) and has no robustness in case of engine change.

SUMMARY OF THE INVENTION

The present invention allows finer modelling of the exhaust process so as to, on the one hand, do without the identification stage and, on the other hand, provide the fuel/air ratio estimation model with more robustness, for all the engine working points. The invention furthermore allows performing of measurements every 6°-crankshaft rotation, and therefore to obtain high-frequency fuel/air ratio measurement information without being disturbed by the measurement noise.

The present invention thus relates to a method of estimating the fuel/air ratio in each cylinder of an internal-combustion engine comprising a gas exhaust circuit including at least cylinders connected to a manifold and a fuel/air ratio detector ($\lambda$) downstream from the manifold. The method is characterized in that it comprises the following steps:

establishing a physical model representing in real time the expulsion of the gases from each cylinder and their travel in the exhaust circuit up to the detector;

defining an estimation of the fuel/air ratio ($\lambda$) measured by the detector from at least one variable of the model;

coupling the model with an adaptive type nonlinear estimator wherein the estimation of the measured fuel/air ratio measurement is taken into account; and performing a real-time estimation of the fuel/air ratio value in each cylinder from the adaptive type nonlinear estimator.

A lag time due to the gas transit time and to the detector response time can also be evaluated by carrying out a test disturbance in a determined cylinder and by measuring its effect by means of the detector.

According to an embodiment, the physical model can comprise at least the following three variable types: the total mass of gas in the exhaust manifold ($M_T$), the mass of fresh air in the exhaust manifold ($M_{air}$) and the fuel/air ratios in each cylinder ($\lambda_i$). This embodiment can also include at least the following two types of data: the total mass of gas in the exhaust manifold ($M_T$) and the mass flow rates leaving said cylinders ($d_i$).

The measured fuel/air ratio ($\lambda$) can be estimated as a function of the total mass of gas in the exhaust manifold ($M_T$) and the mass of fresh air in the exhaust manifold ($M_{air}$).

Estimation of the fuel/air ratio value in each cylinder can then involve real-time correction of the estimation of the total mass of gas in the exhaust manifold ($M_T$), of the estimation of the mass of fresh air in the exhaust manifold ($M_{air}$) and of the estimation of the fuel/air ratio value in each cylinder ($\lambda_i$).

Finally, the method can be applied to an engine control for adapting the fuel masses injected into each cylinder in order to adjust the fuel/air ratio in all the cylinders.

BRIEF DESCRIPTION OF THE DRAWINGS

Other features and advantages of the present invention will be clear from reading the description hereafter of a non-limitative embodiment example, illustrated by the accompanying figures, wherein.

DETAILED DESCRIPTION OF THE INVENTION

The advantages of a fuel/air ratio estimation in each cylinder individually are numerous in relation to an average fuel/air ratio estimation for all of the cylinders:

cost price gain if the estimation is performed from a single fuel/air ratio probe at the turbine outlet, emissions reduction, improved driveability (delivered torque regulation), fuel consumption reduction, and injection system diagnosis (detection of the drift of an injection nozzle or of the failure of the injection system).

Description of the Exhaust Process

Figure 1:
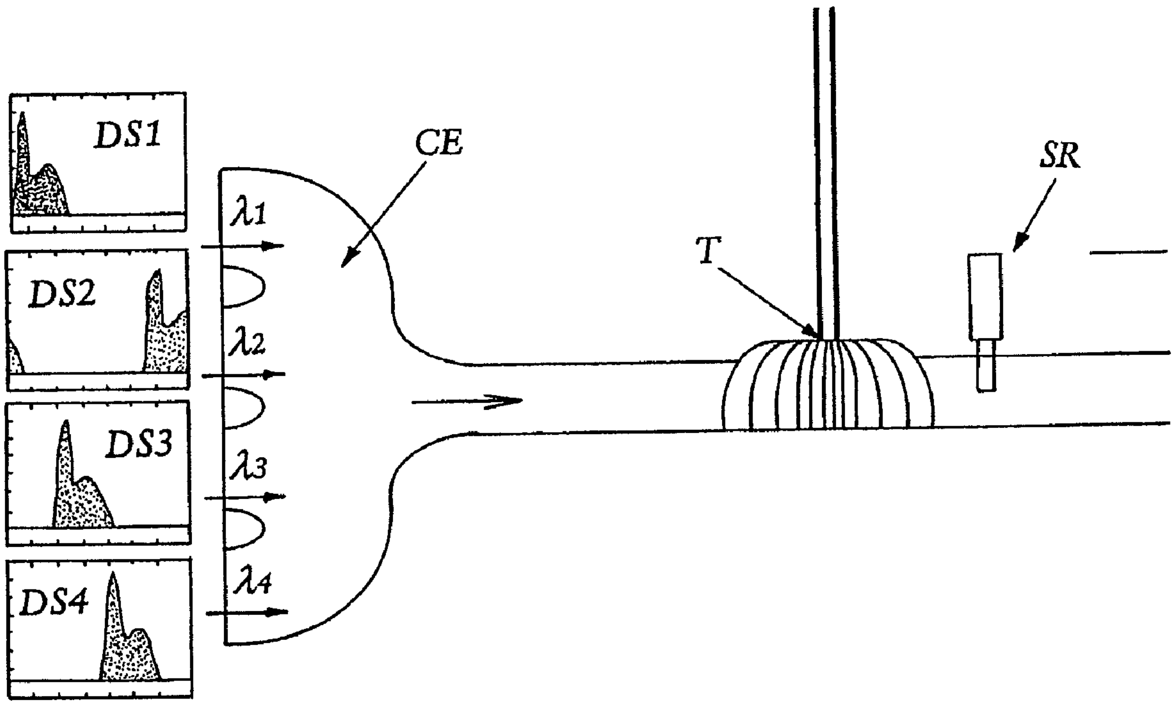
FIG. 1 diagrammatically shows the descriptive elements of the exhaust process.

The exhaust process comprises the path traveled by the gases from the exhaust valve to the open air, at the exhaust silencer outlet. The engine in the present embodiment example is a 2200-cm$^3$ 4-cylinder engine. It is equipped with a variable-geometry turbosupercharger. The diagram of FIG. 1 shows the descriptive elements of the exhaust process, wherein:

$\lambda_1$ to $\lambda_4$ are the fuel/air ratios in each one of the four cylinders, SR is the fuel/air ratio probe, CE corresponds to the exhaust manifold, T corresponds to the turbine of the turbosupercharger, and DS1 to DS4 represent the flow rates at the cylinder outlets.

Fuel/air ratio probe (SR) is arranged just after turbine (T). The gases, after combustion in the cylinder, undergo the following actions:

passage through the exhaust valve. The latter being controlled by a camshaft, the lift law is bell-shaped. The flow rates will go from a high value, when the valve opens, to a lower value when the cylinder and manifold pressures become equal, and they will eventually increase again when the piston starts to slide up again to expel the exhaust gases;

passage through a short pipe connecting the manifold to the cylinder head outlet;

a mixing phase in exhaust manifold (CE) where the flows (DS1 to DS4) from the four cylinders meet. It is here that the cylinder outputs of exhaust mix, depending on the manifold type (symmetrical or asymmetrical), on the EEO (Early Exhaust Opening) and on the LEC (Late Exhaust Closing) which will determine the flow overlap proportion;

passage through the turbine which supplies the compressor arranged upstream from the intake with the required torque. Although its action on the flow rates is not well known, one may consider that it is going to mix even more the cylinder outputs coming from the various cylinders; and measurement by the UEGO type probe.

The composition of the exhaust gases depends on the amounts of fuel and of air fed into the combustion chamber, on the composition of the fuel and on the development of the combustion.

In practice, the fuel/air ratio probe measures the $O_2$ concentration inside a diffusion chamber connected to the exhaust pipe by a diffusion barrier made of a porous material. This configuration can induce differences depending on the location selected for the probe, notably because of the temperature and/or pressure variations near the fuel/air ratio probe.

This fuel/air ratio variation phenomenon depending on the pressure or on the temperature has however been disregarded since what is sought is detection of fuel/air ratio disparities between the cylinders, the mean value being normally kept by the estimator.

In the real-time physical model used by the estimator according to the invention, the measured fuel/air ratio (A) is related to the mass of air (or flow of air) around the probe and to the total mass (or total flow rate). The model is based on a three-gas approach: air, fuel and burnt gases. It is thus considered that, with a lean mixture, all of the gas remaining after combustion is a mixture of air and of burnt gases. For a rich mixture, the fuel being in excess, unburnt fuel and burnt gases are present after combustion, whereas all of the air has disappeared. In reality, the combustion is never 100% complete, but for the estimator it is considered to be complete.

A formulation relating the fuel/air ratio to the masses of the three species mentioned is defined. In the case of a lean mixture: the air is in excess, and no fuel is left after combustion. Before combustion, the following masses are assumed to be present in the cylinder: $M_{air}$, the mass of air, $M_{carb}$ the mass of fuel and $M_{gazB}$ the mass of burnt gases:

$$M_{air}=x;\ M_{carb}=y;\ M_{gazB}=0$$

Knowing that 14.7 times as much air as fuel is required to reach stoichiometric conditions, the table hereunder giving the masses of each species before and after combustion can be drawn up

| | Mass of air | Mass of fuel | Mass of burnt gas |
|---|---|---|---|
| Before combustion | x | y | 0 |
| After combustion | x − 14.7 × y | 0 | y + 14.7 × y |

The fuel/air ratio λ representing ratio $M_{carb}/M_{air}$, after calculation the following formulation is obtained, valid only if the mixture is a lean mixture:

$$\lambda = \frac{M_{gazB}\cdot PCO}{M_{air}\cdot(1+PCO)+M_{gazB}\cdot PCO}$$

where PCO corresponds to ratio $M_{air}/M_{carb}$ when the mixture is stoichiometric. PCO is the calorific value of the fuel.

For a rich mixture, the formula is as follows:

$$\lambda = \frac{M_{carb}\cdot(1+PCO)}{M_{gazB}}+1$$

However, these formulas are valid in the case where the mixture contains no EGR since the presence of burnt gases at the intake changes the concentrations of the three gases at the exhaust.

In the present embodiment, only the fuel/air ratio formula for lean mixtures is used in the estimator, for integration of the fuel/air ratio in equation (7), a very small part of the air (<3%) being disregarded. However, the invention is not limited to this embodiment; in fact, the formula is continuous in the vicinity of a fuel/air ratio of 1, and its inversion poses no problems for rich mixtures.

In order to better apprehend the way the gases mix in the exhaust pipes, a diesel engine model was used with the AMESim software of the IMAGINE Company (France). This model, which cannot be inverted, will be used as a reference to validate the model according to the invention.

AMESim is a OD modelling software, particularly well-suited for thermal and hydraulic phenomena. It notably allows modelling of volumes, pipes or restrictions.

The exhaust model comprises:

the exhaust pipes represented by a volume and a tube, the exhaust manifold with thermal exchanges, the turbine and the bypass valve, a volume at the confluence of the turbine and valve flow rates, a tube between the turbine and the measuring probe, a volume and a tube for the exhaust line.

The elementary blocks for modelling the pipes, restrictions and volumes are described in the AMESim instruction manual "Thermal Pneumatic Library". The standard equations are used to calculate a flow rate through a restriction and the mass and energy conservation. Furthermore, the model takes into account the inertias of the gases, which is important to study the gas composition dynamics.

Since it is a OD model, the time dimension is not taken into account, and it is not possible to model a lag time with a physical approach. If an input variable is changed, the output is immediately changed. The transport time is thus disregarded. This limitation is important when trying to work on real-time acquisitions.

According to the invention, a single real-time physical model is defined to model the global system, that is the entire path traveled by the exhaust gases, from the cylinders through the manifold up to the exhaust downstream from the turbine.

I—Definition of a Real-Time Physical Model

In the present embodiment, the temperature variation is considered low over an engine cycle, and that its action is limited on the flow rate variations. The pressure variations are in fact essential in the process since they are directly related to the flow rates. A fixed temperature is thus set for each element: cylinders, manifold and turbine. The heat exchanges are therefore not modelled either. This simplification hypothesis does not have much impact.

In a first approach, two gases are considered: fresh air and burnt gases. The conventional equations describe the evolution of the total mass of the gases in the volumes, and of the mass of fresh air. The burnt gases can then be deduced therefrom. This procedure is valid in the case of lean mixture conditions, but similar equations can be written for the fuel and the burnt gases, in the case of a rich mixture.

A) Physical Model of the Exhaust Manifold

The exhaust manifold is modelled according to a volume in which there is mass conservation. The temperature is assumed to be substantially constant and determined from a chart as a function of the engine speed and load.

According to the invention, it has been chosen to relate the measured fuel/air ratio to the mass of air around the probe and to the total mass. Thus, conservation of the total mass in the manifold expresses the fact that the exhaust gas mass in the manifold is equal to the exhaust gas mass entering the manifold (cylinder outlet flow rate) decreased by the mass leaving the manifold. The composition of the flow in the turbine is assumed to be the same as at the manifold outlet. Thus, the mass leaving the manifold is equal to the flow passing through the turbine. The following formula is for the total mass:

$$\boxed{N_e \frac{dM_T}{d\alpha} = \sum_{i=1}^{n_{cyl}} d_i(\alpha) - d_T(M_T)} \quad (1)$$

with:

$N_e$: engine speed $\alpha$: crankshaft angle $M_T$: total mass in the exhaust manifold $d_i$: mass flow rate leaving cylinder i $d_T$: total flow rate passing through the turbine.

Similarly, for the air mass conservation, the relationship is:

$$\boxed{N_e \frac{dM_{air}}{d\alpha} = \sum_{i=1}^{n_{cyl}} (1-\lambda_i)\cdot d_i(\alpha) - d_{air}(M_{air})} \quad (2)$$

with:

$N_e$: engine speed $\alpha$: crankshaft angle $M_{air}$: fresh air mass in the exhaust manifold $\lambda_i$: fuel/air ratio in each cylinder $d_i$: mass flow rate leaving cylinder i $d_{air}$: air flow rate passing through the turbine.

The physical models are described allowing determination of the flow rate at the cylinder outlet and the flow rates passing through the turbine.

Model Allowing Determination of the Flow Rate at the Cylinder Outlet: Gas Expulsion The gas flow rate at the cylinder outlet can be modelled by means of a physical model describing the flow rate at the outlet of the exhaust valves. Three variables are used for this expulsion model of the gases through the valves:

crankshaft angle ($\alpha$), the flow inducted through the cylinder $d_{asp}$ (variable estimated by the upstream engine control), the mean fuel/air ratio value measured by the probe $\bar{\lambda}$ over a cycle.

The mean outgoing flow is known from the intake flow and from the injected gasoline flow rate. The instantaneous value of the outgoing flow is based on a template depending on the sucked flow. This template is a physical model (curve) based on an empirical law allowing estimation of a mean flow rate for a cylinder as a function of the crankshaft angle from the engine speed, the crankshaft angle, the intake flow by the cylinder and the mean fuel/air ratio value measured by the probe over a cycle. The only constraint of this physical law is to respect the mean outgoing flow (curve area) and to provide a curve accounting for the two phenomena as follows:

the cylinder/exhaust pressure balance expressed by a flow rate peak as a function of the crankshaft angle; and a flow rate that depends on the cross section of flow of the exhaust valve, expressed by a second flow rate peak of lower amplitude.

This template ($\bar{d}$) provides at the output a course (curve) of the mass flow rate at the exhaust valves outlet $d_i$, that is a common estimation ($\bar{d}$) of the flow rate for all the cylinders. It is obtained in correlation with the engine test bench measurements. Depending on the intake flow and on the mean fuel/air ratio measured by the probe $\bar{\lambda}$, then a homothetic transformation of the template and a phase shift for each cylinder as a function of the crankshaft angle is carried out, so as to deduce the flow rate of the gases at the outlet of each cylinder:

$$d_i(\alpha)=\bar{d}(\alpha_i+\alpha)\alpha_0$$

with:

$d_i(\alpha)$ the gas outlet flow rate at the outlet of cylinder i;

$\bar{d}(\alpha)$ the template, that is an estimation of the flow rate at the cylinder outlet, $$\alpha_0 = d_{asp}\cdot\left(1+\frac{\bar{\lambda}}{PCO}\right);\text{ and}$$

$\alpha_i$ the phase shift angle for cylinder i.

The phase shift of the template curve can be diagrammatically seen in FIG. 1 (DS1 to DS4).

The physical models allowing determination of the flow rate passing through the turbine are described hereafter.

Model Allowing Determination of the Flow Rate Passing Through the Turbine: Turbine Model The turbine is modelled according to a flow passing through a flow rate restriction. The flow rate in the turbine is generally given by mapping (chart) as a function of the turbine speed and of the pressure ratio upstream/downstream from the turbine.

The flow rate passing through the turbine $d_T$ is a function of the total mass ($M_T$) in the exhaust manifold, of the temperature in the exhaust manifold, of the turbo/supercharger speed and of the turbo/supercharger geometry. The input data of this model thus are:

the total mass of exhaust gas ($M_T$);

the mass of air ($M_{air}$);

the engine speed ($N_e$); and the (turbosupercharger) turbine speed.

This flow rate can be estimated from a concave function of the total mass $M_T$. This function is denoted by p. The flow rate in the turbine is then written as follows: $d_T(M_T)=M_T\cdot p(M_T)$.

Function p is a root type function that is expressed as a function of the turbine speed on the one hand and of the ratio of the total mass in the exhaust manifold ($M_T$) to the mass in the manifold under atmospheric conditions ($M_0$) on the other hand. Thus, the mapping gives $p(M_T)$ as a function of ratio $$\frac{M_T}{M_0}$$

and of the (turbosupercharger) turbine speed. The formula used by this mapping is:

$$p(M_T)=f(\text{turbine speed})\cdot\sqrt{\frac{2\cdot g}{g-1}\cdot\left(\left(\frac{M_T}{M_0}\right)^{\frac{-2}{g}}-\left(\frac{M_T}{M_0}\right)^{\frac{-(g+1)}{g}}\right)}$$

where:

$f$ is a polynomial function; and g is a constant.

The parameters of function $f$ are optimized by correlation with the turbine mapping.

Furthermore, the air composition is assumed to be the same as in the exhaust manifold. The flow of air passing through the turbine thus is:

$$d_{air}(M_{air})=\frac{M_{air}}{M_T}d_T(M_T)=M_{air}\cdot p(M_T)$$

Thus, by means of the physical gas expulsion and turbine models, equations (1) and (2) are written as follows:

$$\begin{cases} N_e\dfrac{dM_T}{d\alpha}=\displaystyle\sum_{i=1}^{n_{cyl}}d_i(\alpha)-M_T\cdot p(M_T) \\ N_e\dfrac{dM_{air}}{d\alpha}=\displaystyle\sum_{i=1}^{n_{cyl}}(1-\lambda_i)\cdot d_i(\alpha)-M_{air}\cdot p(M_T) \end{cases} \quad (3)$$

This system of equations (3) is the physical model of the exhaust manifold.

The input data of this model are:

$N_e$: engine speed $\alpha$: crankshaft angle $d_i$: mass flow rate leaving cylinder i $d_T$: total flow rate passing through the turbine $d_{air}$: air flow rate passing through the turbine $\lambda_i$: fuel/air ratio in each cylinder and the unknowns of the system are:

$M_T$: total mass in the exhaust manifold $M_{air}$: mass of fresh air in the exhaust manifold.

The first equation contains one unknown: $M_T$. The second one contains two unknowns: $M_{air}$ and $\lambda_i$. This leads to the additional hypotheses described hereafter.

B) Hypothesis on the Cylinder Outlet Fuel/Air Ratios

In order to complete the real-time physical model (RTM) of the exhaust manifold, it is assumed that the fuel/air ratios at the cylinder outlet are constant over a working point, therefore:

$$N_e\cdot\frac{d\lambda_i}{d\alpha}=0 \quad (4)$$

In fact, since calculation is carried out in real time, constants $\lambda_i$ are estimated.

C) Expression of the Real-Time Physical Model

Finally, the real-time physical model RTM can be expressed in the matrical form as follows:

$$X=\begin{bmatrix} M_T \\ M_{air} \\ \lambda_1 \\ \lambda_2 \\ \lambda_3 \\ \lambda_4 \end{bmatrix} \quad N_e\cdot\frac{dX}{d\alpha}=\begin{bmatrix} \displaystyle\sum_{i=1}^{n_{cyl}}d_i(\alpha)-M_T\cdot p(M_T) \\ \displaystyle\sum_{i=1}^{n_{cyl}}(1-\lambda_i)\cdot d_i(\alpha)-M_{air}\cdot p(M_T) \\ 0 \\ 0 \\ 0 \\ 0 \end{bmatrix} \quad (5)$$

The unknowns of the physical model are eventually $M_T$, $M_{air}$ and the $\square_i$.

The output data of the physical model are $M_T$ and $d_i$.

D) Exhaust Lag Time

The lag times due to the transportation of gas in the pipes and the various volumes, and the "idle time" of the measuring probe, are not taken into account in the physical model described above (system of equations 5). However, the model is constructed linearly in relation to these lag times because transportation in the pipes is disregarded. They can therefore be compiled into a single lag time for all of the exhaust process, and the physical model can be inverted as it is, since the influence of the lag time can be considered later, as explained hereafter.

II—Fuel/Air Ratio Estimator

The above physical model (5) describes that the fuel/air ratio downstream from the turbine (considered to be identical to the fuel/air ratio in the manifold) is expressed as a function of the composition of the gas flow at the exhaust manifold inlet.

The measured data are:

Fuel/air ratio measured by the probe: $\lambda$

The other known data of the system are:

Engine speed: $N_e$

Crankshaft angle: $\alpha$ (Supercharger) turbine speed

Flow inducted by the cylinder.

The modelled data of the system are:

Mass flow rate coming from cylinder i: $d_i$

Total flow rate passing through the turbine: $d_T$

Flow of air passing through the turbine: $d_{air}$

Total mass in the exhaust manifold: $M_T$.

The unknowns thus are:

Fuel/air ratio in each one of the four cylinders: $\lambda_i$

Mass of fresh air in the exhaust manifold: $M_{air}$.

Physical model (5) is nonlinear, and such a system cannot be solved in real time. It is therefore necessary to use an estimator rather than try to directly calculate the unknowns of the system. Selection of the estimator according to the invention is based on the fact that the structure of the system is linear as a function of the fuel/air ratios in the cylinders $\lambda_i$ (the air mass variation is linear as a function of the $\lambda_i$). In this context, a particularly suitable technique is to use an adaptive filter. Thus, in order to estimate the unknowns from the physical model RTM, the method according to the invention proposes constructing an estimator based on an adaptive filter. This estimator allows in the end obtaining an estimation of the fuel/air ratio cylinder by cylinder from the fuel/air ratio measured by the detector located behind the turbine.

In general terms, adaptive filters are systems applied to noise-containing data so as to obtain useful information at a certain time t, these systems being used in three configurations:

filtering, that is extraction of the useful information at the time t from the noise-containing data measured up to and including the time t;

smoothing, which also uses data measured after the time t; and prediction, which only uses data up to the time t−τ to deduce the useful information at the time t.

In this case, the objective is to reconstruct, from the two elements considered as measurements $y_1=M_T$ and $y_2=\lambda$, the following data:

$M_T$: Total mass in the exhaust manifold $M_{air}$: Mass of fresh air in the exhaust manifold $\lambda_i$: Fuel/air ratio in each cylinder.

The measured or modelled input parameters of the estimator thus are:

$$Y = \begin{bmatrix} y_1 \\ y_2 \end{bmatrix} = \begin{bmatrix} M_T \\ \lambda \end{bmatrix} \tag{6}$$

$\lambda$ is measured by the probe and $M_T$ is estimated from the real-time model RTM (5).

By putting:

$\hat{M}_T$: Estimator of the total mass in the exhaust manifold $\hat{M}_{air}$: Estimator of the mass of fresh air in the exhaust manifold $\hat{\lambda}_i$: Estimator of the fuel/air ratio in each cylinder the estimator is written as follows:

$$\begin{cases} N_e \dfrac{d\hat{M}_T}{d\alpha} = \sum_{i=1}^{n_{cyl}} d_i(\alpha) - M_T \cdot p(M_T) - C_{M_T} \\ N_e \dfrac{d\hat{M}_{air}}{d\alpha} = \sum_{i=1}^{n_{cyl}} (1-\lambda_i)\cdot d_i(\alpha) - M_{air}\cdot p(M_T) - C_{M_{air}} \\ N_e \dfrac{d\hat{\lambda}_i}{d\alpha} = -C_{\lambda_i} \end{cases}.$$

In other words, it is the real-time model (5) wherein a corrective term is applied for each parameter to be estimated: $C_{M_T}$, $C_{M_{air}}$, $C_{\lambda_i}$.

The principle of the estimator is to make physical model (5) and consequently fuel/air ratios $\lambda_i$ converge to reality. In fact, model (5) gives at the output $M_T$ and $M_{air}$, and furthermore present are input parameters Y. The estimator thus compares the output values of the real-time model RTM with the input values, then carries out the suitable corrections. For example, fuel/air ratios $\lambda_i$ have to adjust as a function of the error on $M_T$ and $\lambda$: if the error between input values $M_T$ and $\lambda$ and the corresponding estimated values $\hat{M}_T$ and $\hat{\lambda}$ is negative, the estimated values have to be increased and vice versa. Therefore:

$$N_e \frac{d\hat{\lambda}_i}{d\alpha} = -L_\lambda\left(d_i(\alpha)\cdot\hat{M}_{air} - d_i(\alpha)\cdot M_{air}\right).$$

By applying the same principle for the corrections of $M_T$ and $M_{air}$, it is obtained:

$$\begin{cases} C_{M_T} = L_1\left(\hat{M}_T - M_T\right) \\ C_{M_{air}} = L_2\left(\hat{M}_{air} - M_{air}\right) \\ C_{\lambda_i} = L_\lambda\left(d_i(\alpha)\cdot\hat{M}_{air} - d_i(\alpha)\cdot M_{air}\right) \end{cases}$$

where $L_1$, $L_2$, $L_\lambda$ are adjustment parameters allowing control of the rate of convergence to the solution of the three unknowns. These are strictly positive real parameters. These parameters are adjusted manually so as to obtain a good compromise between the rate of convergence and the low sensitivity to the measurement noise.

Finally, by using the fuel/air ratio equation described above, it is possible to estimate the fuel/air ratio measured from $M_T$ and $M_{air}$:

$$\lambda = \frac{M_{gazB} \cdot PCO}{M_{air} \cdot (1 + PCO) + M_{gazB} \cdot PCO} = 1 - \frac{M_{air}}{M_T} \qquad (7)$$

It is deduced: $M_{air}=(1-\lambda)M_T$.

By using notations $y_1=M_T$ and $y_2=\lambda$, the estimator of the physical model RTM based on the adaptive filter and on the fuel/air ratio estimation from $M_T$ and $M_{air}$ is written as follows:

$$\begin{cases} N_e \frac{d\hat{M}_T}{d\alpha} = \sum_{i=1}^{n_{cyl}} d_i(\alpha) - \delta_T y_1 p(\delta_T y_1) - L_1(\hat{M}_T - \delta_T y_1) \\ N_e \frac{d\hat{M}_{air}}{d\alpha} = \sum_{i=1}^{n_{cyl}} (1-\lambda_i) d_i(\alpha) - (1-y_2)\delta_T y_1 p(\delta_T y_1) - L_2(\hat{M}_{air} - (1-y_2)\delta_T y_1) \\ N_e \frac{d\hat{\lambda}_i}{d\alpha} = -L_\lambda d_i(\alpha)(\hat{M}_{air} - (1-y_2)\delta_T y_1) \end{cases} \qquad (8)$$

with $\delta_T=1$.

The estimator thus constructed allows real-time correction of $M_T$, $M_{air}$ and $\lambda$ from a first value of $M_T$ provided by the real-time model and from the fuel/air ratio measured by the probe.

System (8) is numerically solved in real time, the calculator using an explicit Euler discretization known in the art.

Simulation Results: Estimator Test (8)

From the known individual fuel/air ratios, it is estimated by means of the reference modelling AMESim a fuel/air ratio at the probe (A). This fuel/air ratio value ($\lambda$) is used at the estimator input. The dynamics of the probe has not been taken into account. Injection unbalances are applied and the cylinder by cylinder estimation of fuel/air ratio ($\lambda_i$) from the fuel/air ratio measured behind the turbine ($\lambda$) is observed.

Figure 2A:
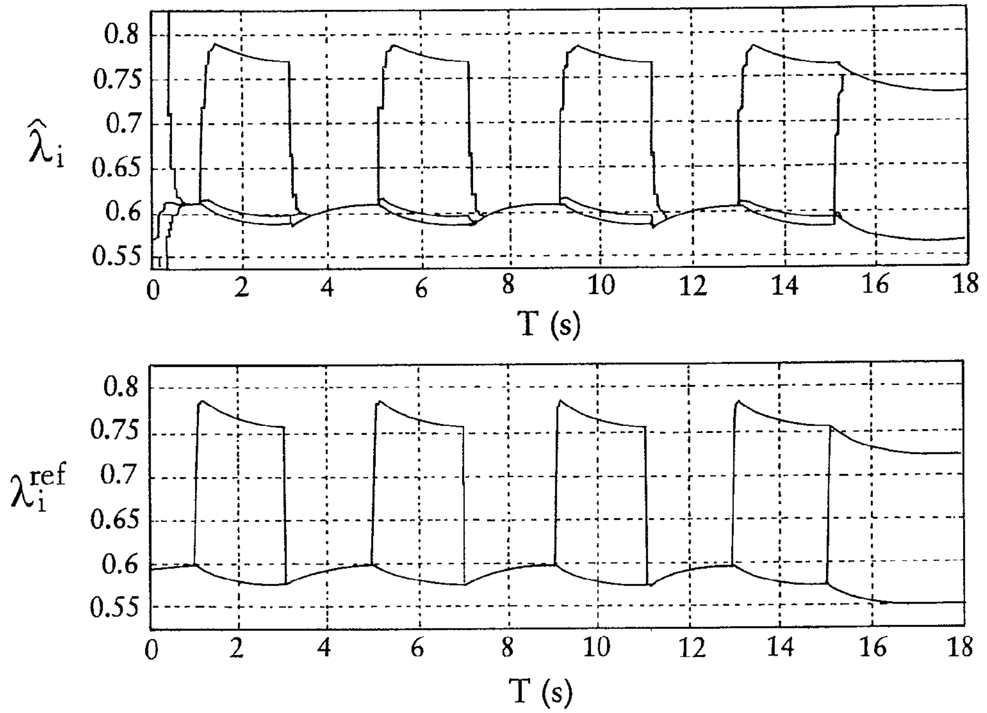
FIGS. 2A and 2B illustrate the reference fuel/air ratios ($\lambda_i^{ref}$) as a function of time (T) and the results of the estimator according to the invention ($\hat{\lambda}_i$) as a function of time (T), for each one of the four cylinders.
Figure 2B:
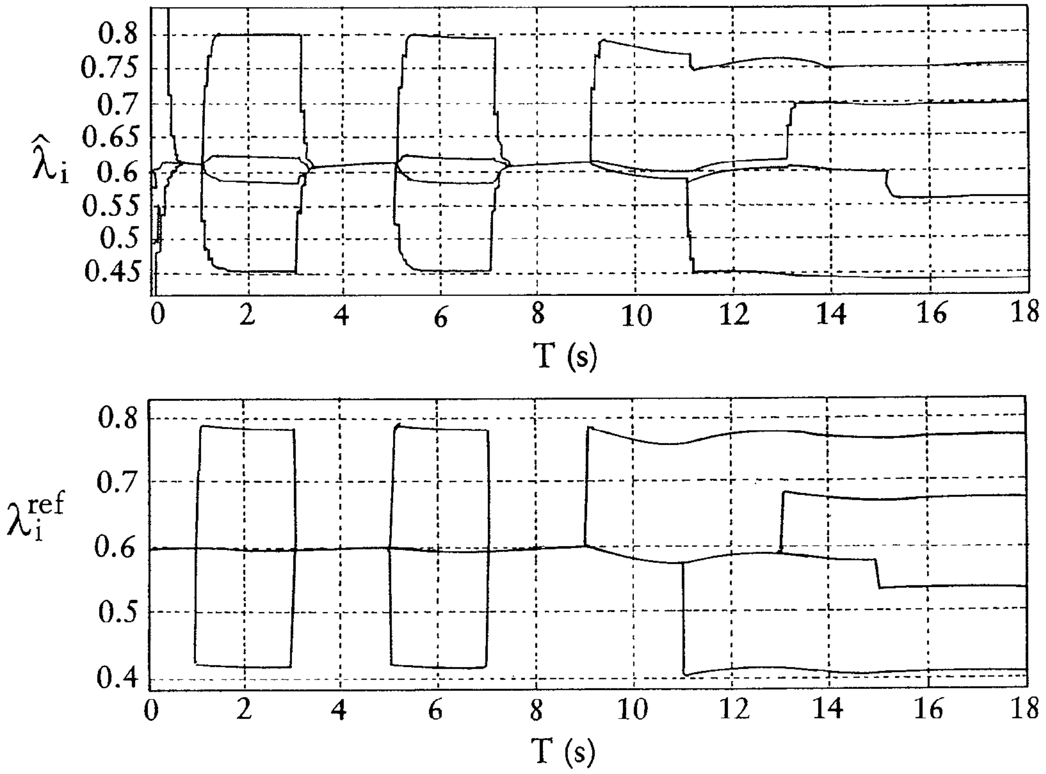

For simulation, unbalance the 4 cylinders is successive by applying 80 µs more injection to the cylinder, then cylinder 1 and 4 are unbalanced similarly. FIGS. 2A and 2B show, at the bottom, the fuel/air ratios ($\lambda_i^{ref}$) given by AmeSim as a function of time (T) and, at the top, the results of the estimator ($\hat{\lambda}_i$) as a function of time (T). The four curves correspond to each one of the four cylinders. The performance of the estimator based on the adaptive filter is very good. A slight phase difference, due to the inertia of the gas that is not taken into account in the present model, can however be noted. It is therefore decided to complete the model and the estimator by an exhaust lag time estimator.

Exhaust Lag Time Estimator

The estimator implemented as described above does not allow the estimation method to take account of the lag time between the cylinder exhaust and the signal acquired by the probe. In reality, the lag time is due to several sources: transport time in the pipes and through the volumes, idle time of the measuring probe.

Figure 3:
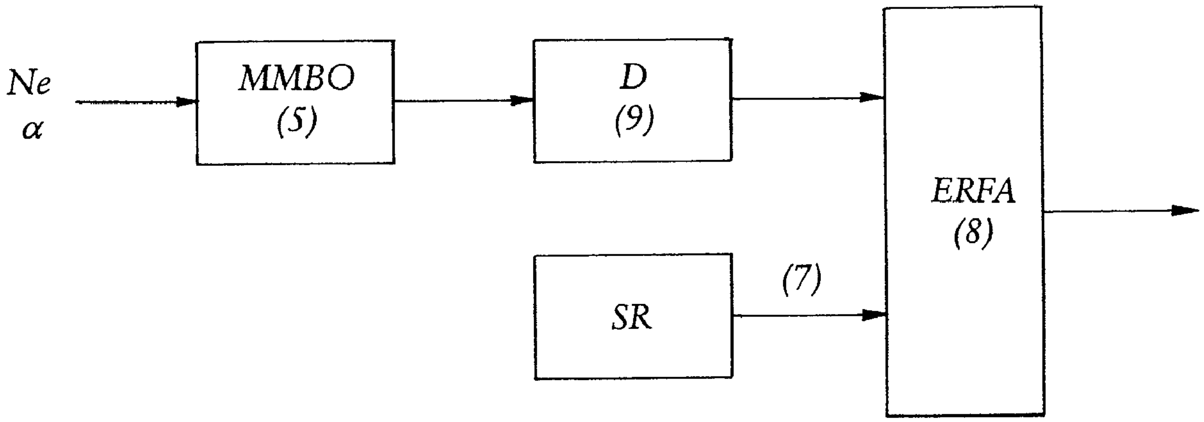
FIG. 3 shows the structure of the estimator.

By applying a lag time D at the estimator input to the variables from the model, the estimator can be synchronized with the fuel/air ratio measurements. The structure of the estimator with a lag time is illustrated in FIG. 3, wherein:

$N_e$ and $\alpha$ are the input data of the real-time model RTM described by equations (5);

MMBO is the Open Loop Mass Model (model RTM);

D is the lag time applied to the output variables of model RTM (MMBO); this lag time is obtained from equation (9);

SR is the probe measuring the fuel/air ratio downstream from the turbine used in the estimator via equation (7);

ERFA is the Fuel/Air Ratio Estimator based on an Adaptive Filter and described by equation (8); and $\lambda_i$ is the fuel/air ratio in cylinder i estimated by estimator ERFA.

The lag time depends on the operating conditions: engine speed, load, exhaust manifold pressure, etc. Since the lag time is difficult to model, an identification method was developed to calculate in real time the lag time between the estimator and the measurements without using an additional instrument. The principle is to apply a small increment in the vicinity of the injection point of cylinder 1, and in calculating the estimated fuel/air ratio variations for each cylinder. Then, an identification criterion $J_k$ is constructed so as to penalize the variations of cylinders 2, 3 and 4.

$$\begin{cases} \beta = [0, 1, -1, 2] \\ J_k = \beta^*(\Lambda_k - \Lambda_0) \end{cases} \qquad (9)$$

with:

$$\Lambda_k = \begin{bmatrix} \hat{\lambda}_1 \\ \hat{\lambda}_2 \\ \hat{\lambda}_3 \\ \hat{\lambda}_4 \end{bmatrix} : \text{composition at increment } k$$

$$\Lambda_0 = \begin{bmatrix} \lambda_1^{ref} \\ \lambda_2^{ref} \\ \lambda_3^{ref} \\ \lambda_4^{ref} \end{bmatrix} : \text{reference composition}$$

The penalization is given by $\beta$. If there is a positive variation of the fuel/air ratio value estimated for cylinder 2, the lag time between the estimator and the measurements is positive. If there is a variation on cylinder 3, the lag time is negative and the penalization is negative. A variation of cylinder 4 can be considered to be a consequence of a positive or negative lag time. Lag time D applied to the output variables of model RTM is an additive delay, it is calculated by least squares by minimizing $J_k$.

Criterion $J_k$ is controlled at zero by a controller PI (Integral Proportional) on the estimator lag time. When the controller is stabilized, the estimated fuel/air ratio variation is maximum on cylinder 1 and minimum on cylinder 4. The estimator is then in phase with the measurements.

Results

Figure 4A:
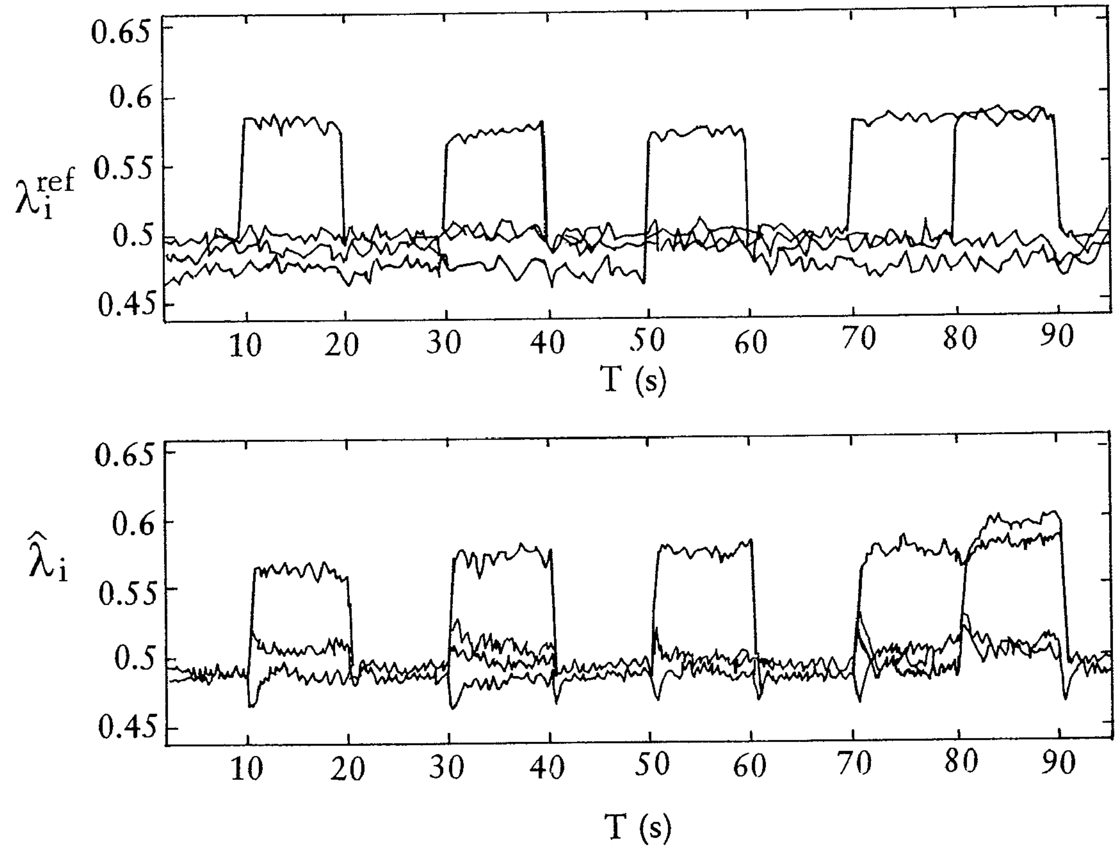
FIGS. 4A and 4B illustrate the reference fuel/air ratios ($\hat{\lambda}_i^{ref}$) as a function of time (T) and the results of the estimator taking account of the lag according to the invention ($\hat{\lambda}_i$) as a function of time (T), for each one of the four cylinders.
Figure 4B:
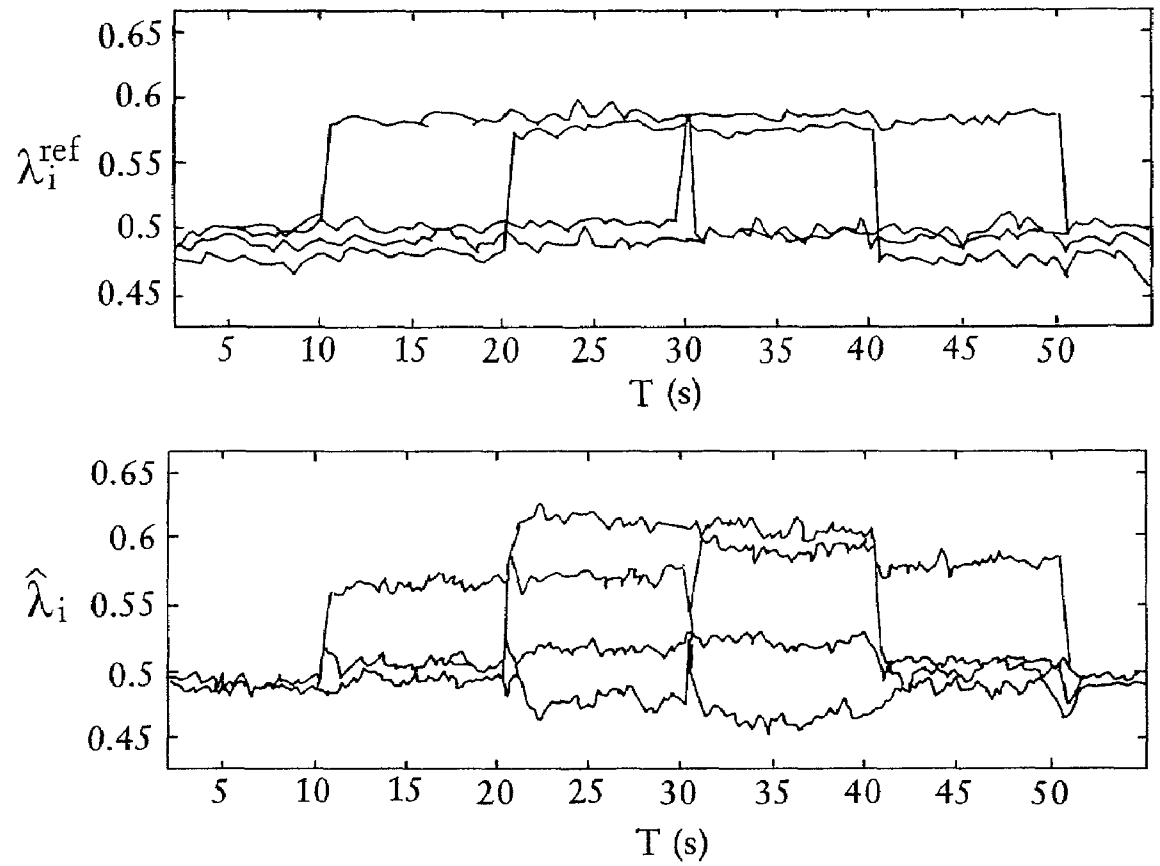

FIGS. 4A and 4B illustrate the estimation of the fuel/air ratio cylinder by cylinder by means of the estimator described above at 1500 rpm at medium load. These figures show, at the top, the reference fuel/air ratios ($\lambda_i^{ref}$) as a function of time (T) and, at the bottom, the results of the estimator ($\hat{\lambda}_i$) as a function of time (T). The four curves correspond to each one of the four cylinders.

The present invention relates to an estimation method comprising construction of an estimator allowing, from the fuel/air ratio measured by the probe (λ) and the information on the total mass of gas inside the manifold ($M_T$), to estimate the fuel/air ratios at the outlet of the four cylinders ($\lambda_i$). The estimator thus achieved is efficient and, above all, it requires no additional adjustment in case of a working point change. No identification stage is necessary, a single measurement noise and model adjustment only has to be performed.

In order to make the estimation according to the invention more robust, whatever the operating conditions, a lag time controller is used in parallel with the estimator, allowing to re-adjust the lag time after an injection time increment on a cylinder. This allows optimum calibration of the estimator, for example before a fuel/air ratio 1 phase.

The invention also allows performing a measurement every 6° crankshaft rotation and thus to have high-frequency information of the fuel/air ratio measurement without however being affected by the measurement noise. Furthermore, the high-frequency representation allows accounting for the pulsating effect of the system. The modelled system is periodic and it allows obtaining an estimator with better dynamics: the exhaust pulsation is anticipated.

Besides, the invention allows the calculating time to be reduced by approximately a factor of 80 in relation to prior methods.

The invention claimed is:

1. A method of estimating fuel and air ratio in each cylinder of an internal combustion engine including a gas exhaust circuit, cylinders connected to a manifold, a turbine for providing a pressurized air and fuel mixture to the cylinders and a detector measuring a fuel and air ratio downstream from the manifold, comprising:

- providing a physical model representing in real time expulsion of gases from each cylinder and travel in the exhaust circuit up to the detector, the physical model including a physical model of expulsion of gases from each cylinder, a physical model of the manifold, a physical model of flow rate of gases passing through the turbine, and a physical model of lag time due to transportation of gases from each cylinder to the detector;
- defining an estimation of the fuel and air ratio measured by the detector from at least one variable of the physical model representing in real time the expulsion of the gases;
- coupling the physical model representing in real time the expulsion of the gases with an adaptive type nonlinear estimator wherein the estimation of the measured fuel/air ratio measurement is utilized; and
- performing a real time estimation of the fuel and air ratio value in each cylinder from the adaptive type nonlinear estimator.

2. A method as claimed in claim 1 comprising using the estimation of the fuel and air ratio in each cylinder to control injection of fuel masses into each cylinder of the engine to adjust the fuel/air ratio in all the cylinders.

3. A method as claimed in claim 1, wherein the estimation of the fuel/air ratio value in each cylinder comprises real-time correction of an estimation of the total mass of gas in the exhaust manifold, of an estimation of the mass of fresh air in the exhaust manifold and of an estimation of the fuel/air ratio value in each cylinder.

4. A method as claimed in claim 3 comprising using the estimation of the fuel and air ratio in each cylinder to control injection of fuel masses into each cylinder of the engine to adjust the fuel and air ratio the cylinders.

5. A method as claimed in claim 1, wherein the measured fuel/air ratio is estimated as a function of a total mass of gas in the exhaust manifold and of a mass of fresh air in the exhaust manifold.

6. A method as claimed in claim 5, wherein the estimation of the fuel and air ratio value in each cylinder comprises real-time correction of an estimation of the total mass of gas in the exhaust manifold, of an estimation of the mass of fresh air in the exhaust manifold and of an estimation of the fuel and air ratio value in each cylinder.

7. A method as claimed in claim 5 comprising using the estimation of the fuel and air ratio in each cylinder to control injection of fuel masses into each cylinder of the engine to adjust the fuel and air ratio the cylinders.

8. A method as claimed in claim 1, wherein the physical model comprises at least the two output data types as follows: total mass of gas in the exhaust manifold and the mass flow rates coming from the cylinders.

9. A method as claimed in claim 8, wherein the measured fuel/air ratio is estimated as a function of a total mass of gas in the exhaust manifold and of a mass of fresh air in the exhaust manifold.

10. A method as claimed in claim 8, wherein the estimation of the fuel and air ratio value in each cylinder comprises real-time correction of an estimation of the total mass of gas in the exhaust manifold, of an estimation of the mass of fresh air in the exhaust manifold and of an estimation of the fuel/air ratio value in each cylinder.

11. A method as claimed in claim 8 comprising using the estimation of the fuel and air ratio in each cylinder to control injection of fuel masses into each cylinder of the engine to adjust the fuel and air ratio the cylinders.

12. A method as claimed in claim 1, wherein the physical model comprises at least the three variable types as follows: a total mass of gas in the exhaust manifold, a mass of fresh air in the exhaust manifold and fuel/air ratios in each cylinder.

13. A method as claimed in claim 12, wherein the physical model comprises at least the two output data types as follows: total mass of gas in the exhaust manifold and the mass flow rates coming from the cylinders.

14. A method as claimed in claim 12, wherein the measured fuel and air ratio is estimated as a function of a total mass of gas in the exhaust manifold and of a mass of fresh air in the exhaust manifold.

15. A method as claimed in claim 12, wherein the estimation of the fuel and air ratio value in each cylinder comprises real-time correction of an estimation of the total mass of gas in the exhaust manifold, of an estimation of the mass of fresh air in the exhaust manifold and of an estimation of the fuel and air ratio value in each cylinder.

16. A method as claimed in claim 12 comprising using the estimation of the fuel and air ratio in each cylinder to control injection of fuel masses into each cylinder of the engine to adjust the fuel/air ratio the cylinders.

17. A method as claimed in claim 1, wherein a lag time due to a gas transit time and to detector response time is evaluated by carrying out a test disturbance in a determined cylinder and by measuring an effect thereof at the detector.

18. A method as claimed in claim 17, wherein the physical model comprises at least the three variable types as follows: a total mass of gas in the exhaust manifold, a mass of fresh air in the exhaust manifold and fuel and air ratios in each cylinder.

19. A method as claimed in claim 17, wherein the physical model comprises at least the two output data types as follows: total mass of gas in the exhaust manifold and the mass flow rates coming from the cylinders.

20. A method as claimed in claim 17, wherein the measured fuel and air ratio is estimated as a function of a total mass of gas in the exhaust manifold and of a mass of fresh air in the exhaust manifold.

21. A method as claimed in claim 17, wherein the estimation of the fuel and air ratio value in each cylinder comprises real-time correction of an estimation of the total mass of gas in the exhaust manifold, of an estimation of the mass of fresh air in the exhaust manifold and of an estimation of the fuel and air ratio value in each cylinder.

22. A method as claimed in claim 17 comprising using the estimation of the fuel and air ratio in each cylinder to control injection of fuel masses into each cylinder of the engine to adjust the fuel and air ratio the cylinders.

* * * * *